(12) United States Patent
Ditomasso et al.

(10) Patent No.: US 11,136,991 B2
(45) Date of Patent: Oct. 5, 2021

(54) TANDEM BLADE ROTOR DISK

(71) Applicant: RAYTHEON TECHNOLOGIES CORPORATION, Farmington, CT (US)

(72) Inventors: John C. Ditomasso, Glastonbury, CT (US); Matthew P. Forcier, South Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/866,303

(22) Filed: May 4, 2020

(65) Prior Publication Data
US 2020/0392967 A1 Dec. 17, 2020

Related U.S. Application Data

(62) Division of application No. 15/642,677, filed on Jul. 6, 2017, now abandoned.

(51) Int. Cl.
*F04D 29/32* (2006.01)
*F01D 5/34* (2006.01)
(Continued)

(52) U.S. Cl.
CPC ........... *F04D 29/324* (2013.01); *F01D 5/142* (2013.01); *F01D 5/146* (2013.01); *F01D 5/3007* (2013.01);
(Continued)

(58) Field of Classification Search
CPC ...... F04D 29/324; F04D 19/02; F04D 29/321; F04D 29/644; F04D 29/322; F01D 5/146;
(Continued)

(56) References Cited

U.S. PATENT DOCUMENTS 3,937,592 A * 2/1976 Bammert ................ F01D 5/142
415/194
4,483,659 A 11/1984 Armstrong
(Continued)

FOREIGN PATENT DOCUMENTS

CH 351065 12/1960
DE 102004026367 12/2005
(Continued)

OTHER PUBLICATIONS

European Patent Office, European Search Report dated Nov. 19, 2018 in Application No. 18170398.4.
(Continued)

*Primary Examiner* — Hung Q Nguyen
(74) *Attorney, Agent, or Firm* — Snell & Wilmer L.L.P.

(57) ABSTRACT

A tandem rotor disk apparatus may include a rotor disk body concentric about an axis. The tandem rotor disk apparatus may also include a first blade extending radially outward of the rotor disk body and a second blade extending radially outward of the rotor disk body. The first blade may be offset from the second blade in a direction parallel to the axis. The tandem rotor disk apparatus may be implemented in a gas turbine engine with no intervening stator vane stages disposed between the first blade and the second blade. The tandem rotor disk apparatus may include two separate rotor disk bodies.

8 Claims, 10 Drawing Sheets

(51) Int. Cl.
  *F01D 5/14* (2006.01)
  *F01D 5/30* (2006.01)
  *F04D 29/64* (2006.01)
  *F04D 19/02* (2006.01)
  *F02C 3/04* (2006.01)

(52) U.S. Cl.
  CPC .............. *F01D 5/3038* (2013.01); *F01D 5/34* (2013.01); *F04D 19/02* (2013.01); *F04D 29/321* (2013.01); *F04D 29/322* (2013.01); *F04D 29/644* (2013.01); *F02C 3/04* (2013.01); *F05D 2220/32* (2013.01)

(58) Field of Classification Search
  CPC .......... F01D 5/142; F01D 5/34; F01D 5/3038; F01D 5/3007; F02C 3/04; F05D 2220/32
  See application file for complete search history.

(56) References Cited

U.S. PATENT DOCUMENTS

| | | |
|---|---|---|
| 5,183,389 A | 2/1993 | Gilchrist |
| 6,099,249 A | 8/2000 | Hashimoto |
| 6,152,698 A | 11/2000 | Gregg |
| 6,350,103 B1 | 2/2002 | Hashimoto et al. |
| 8,534,997 B2 | 9/2013 | Guemmer |
| 8,573,941 B2 | 11/2013 | Hoeger |
| 2015/0240643 A1 | 8/2015 | Guemmer |
| 2016/0061205 A1 | 3/2016 | Pereira Filho |
| 2016/0108735 A1 | 4/2016 | Forcier et al. |
| 2016/0369816 A1 | 12/2016 | Schwarz et al. |

FOREIGN PATENT DOCUMENTS

| | | |
|---|---|---|
| DE | 102007035726 | 2/2009 |
| EP | 3009598 | 4/2016 |
| EP | 3115555 | 1/2017 |
| EP | 3163028 | 5/2017 |
| GB | 628263 | 8/1949 |
| GB | 2235734 | 3/1991 |

OTHER PUBLICATIONS

USPTO, Restriction/Election Requirement dated Jun. 14, 2019 in U.S. Appl. No. 15/642,677.
USPTO, Pre-Interview First Office Action dated Oct. 7, 2019 in U.S. Appl. No. 15/642,677.
USPTO, First Action Interview Office Action dated Feb. 10, 2020 in U.S. Appl. No. 15/642,677.

\* cited by examiner

TANDEM BLADE ROTOR DISK

CROSS REFERENCE TO RELATED APPLICATION

This application is a divisional of, claims priority to and the benefit of, U.S. Ser. No. 15/642,677 filed on Jul. 6, 2017 and entitled "TANDEM BLADE ROTOR DISK," which is hereby incorporated by reference in its entirety for all purposes.

GOVERNMENT LICENSE RIGHTS

This disclosure was made with government support under Contract No. FA8650-15-D-2502 awarded by the United States Air Force. The government has certain rights in the disclosure.

FIELD

The present disclosure relates to gas turbine engines, and more specifically, blade stages of gas turbine engines.

BACKGROUND

A gas turbine engine typically includes a fan section, a compressor section, a combustor section, and a turbine section. Certain sections of conventional gas turbine engines, such as the compressor section, include alternating stages of vanes and rotors. Increased temperatures in gas turbine engines can reduce the durability of engine components, such as the aft-most vane and/or blade stage in a high pressure compressor of the compressor section of a gas turbine engine. For example, shroud cavities radially inward of stator stages are often susceptible to damage from the high temperature of the air flowing through the compressor section.

SUMMARY

In various embodiments, the present disclosure provides a tandem rotor disk apparatus that includes a rotor disk body, a first blade, and a second blade. The rotor disk body is concentric about an axis and the first and second blades extend radially outward from the rotor disk body. The first blade is offset from the second blade in a direction parallel to the axis.

In various embodiments, one of the first blade and the second blade is coupled to the rotor disk body and the other of the first blade and the second blade is integrally formed with the rotor disk body. The one of the first blade and the second blade may be coupled via axial engagement to the rotor disk body. The one of the first blade and the second blade may be coupled via tangential engagement to the rotor disk body. In various embodiments, both the first blade and the second blade are coupled to the rotor disk body. For example, the first blade and the second blade may be integrally formed together and are thus jointly coupled to the rotor disk body. In various embodiments, the first blade and the second blade are individually coupled to the rotor disk body. In various embodiments, both the first blade and the second blade are integrally formed with the rotor disk body.

Also disclosed herein, according to various embodiments, is a tandem rotor disk apparatus that includes a first rotor disk body concentric about an axis and a second rotor disk body directly coupled to the first rotor disk body and concentric about the axis. The tandem rotor disk apparatus also includes a first blade extending radially outward of the first rotor disk body and a second blade extending radially outward of the second rotor disk body. The first rotor disk body and the first blade are offset from the second rotor disk body and the second blade in a direction parallel to the axis.

In various embodiments, the first rotor disk body is coupled to the second rotor disk body via a snap interference fit. In various embodiments, the first rotor disk body is coupled to the second rotor disk body via one or more tie rods.

Also disclosed herein, according to various embodiments, is a gas turbine engine. The gas turbine engine may include a blade stage comprising sets of tandem blades circumferentially distributed about an engine central longitudinal axis of the gas turbine engine. Each set of tandem blades may include a forward blade and an aft blade that are directly axially adjacent to each other without an intervening stator vane.

In various embodiments, the blade stage is of a compressor section. In various embodiments, the blade stage is an aft-most blade stage of the compressor section. In various embodiments, the gas turbine engine further includes a rotor disk body and the sets of tandem blades extend radially outward from the rotor disk body.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine. A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor. The term "axial," as used herein, refers to a direction along or parallel to the engine central longitudinal axis.

Figure 1A:
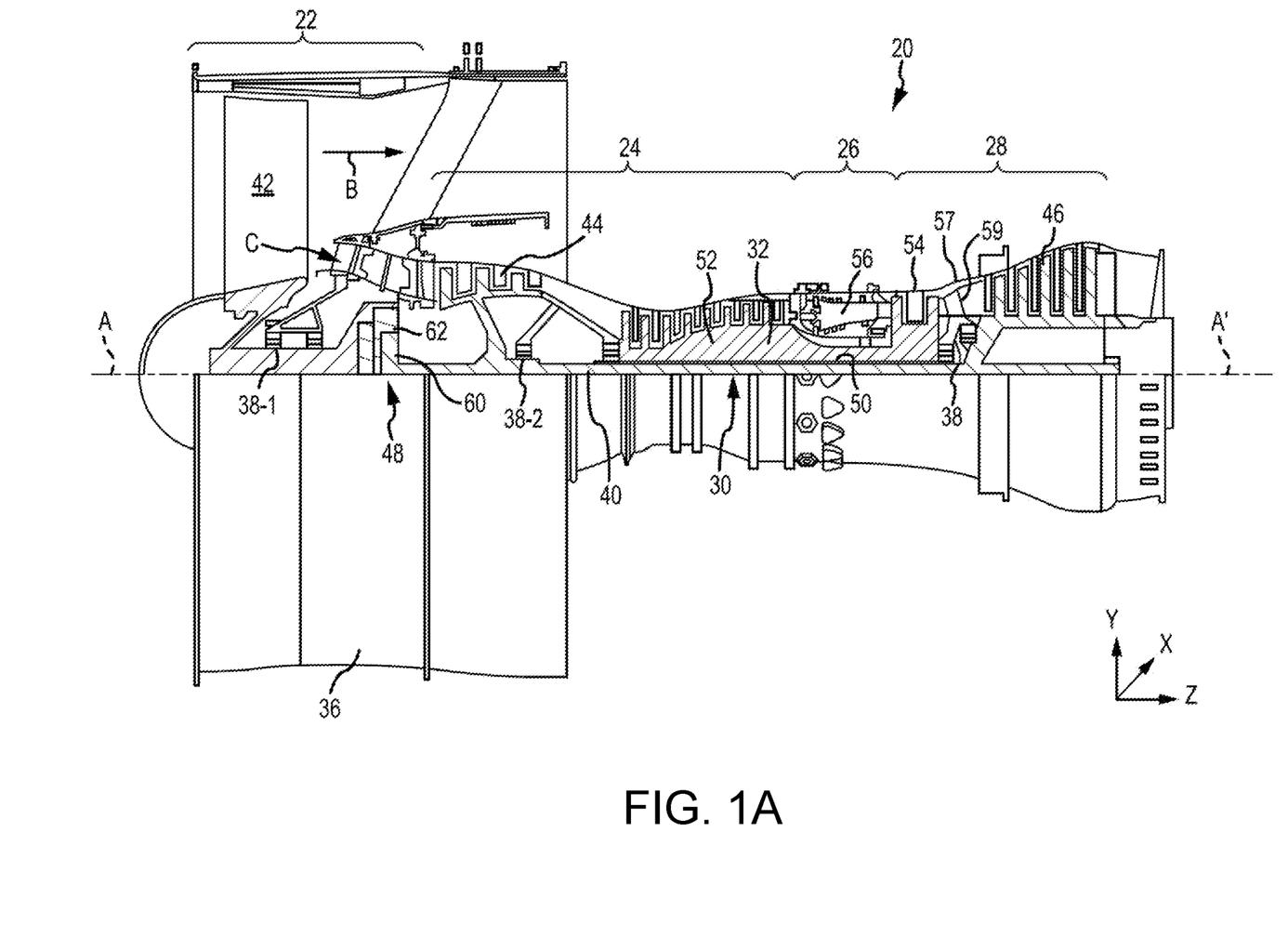
FIG. 1A is a cross-sectional view of an exemplary gas turbine engine, in accordance with various embodiments.

In various embodiments and with reference to FIG. 1A, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 1B:
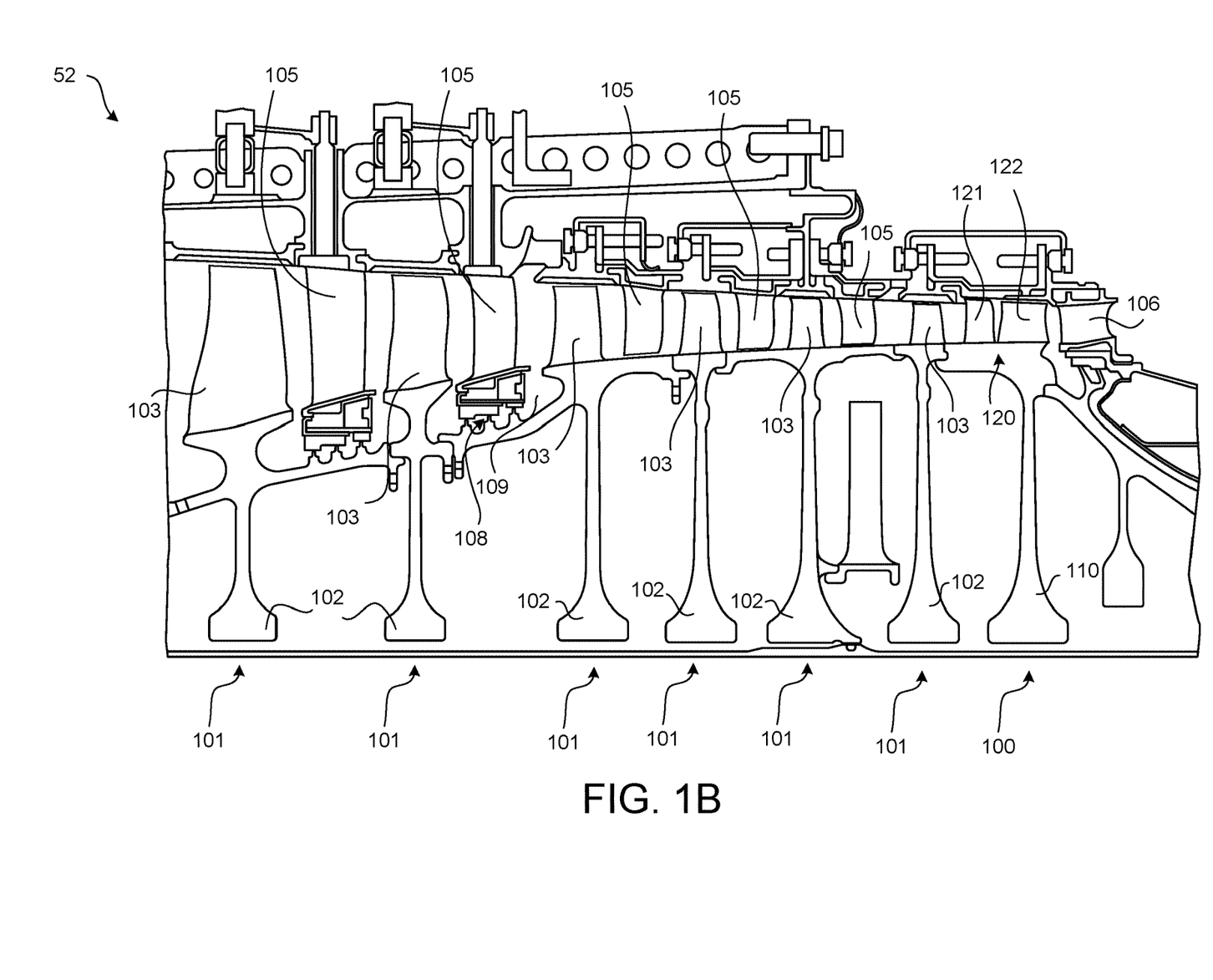
FIG. 1B is a cross-sectional view of a compressor section of a gas turbine engine, in accordance with various embodiments.

In various embodiments, and with reference to FIG. 1B, high pressure compressor 52 of the compressor section 24 of gas turbine engine 20 is provided. The high pressure compressor 52 includes a plurality of blade stages 101 (i.e., rotor stages) and a plurality of vane stages 105 (i.e., stator stages). The blade stages 101 may each include a rotor disk 102 and blades 103 extending radially outward from the rotor disk 102. In various embodiments, one of the blade stages is a tandem rotor disk apparatus 100 (i.e., tandem blade stage), as described in greater detail below. The gas turbine engine 20 may further include an exit guide vane stage 106 that defines the aft end of the high pressure compressor 52. In various embodiments, the tandem rotor disk apparatus 100 is positioned forward of the exit guide vane stage 106 and is thus the aft-most blade stage.

The tandem rotor disk apparatus 100 generally combines two blade stages into a single stage. That is, the tandem rotor disk apparatus 100 includes a rotor disk body 110, concentric about the engine central longitudinal axis A-A', and sets of tandem blades 120, such as a first blade 121 and a second blade 122, that are positioned radially outward of the rotor disk body 110, according to various embodiments. the sets of tandem blades 120 may be circumferentially distributed about the engine central longitudinal axis A-A' of the gas turbine engine 20. The first blade 121 is axially offset from the second blade 122, according to various embodiments. Said differently, the first blade 121 may be a forward blade and the second blade 122 may be an aft blade. In various embodiments, the first blade 121 is offset, in a direction parallel to the engine central longitudinal axis A-A', from the second blade 122. In various embodiments, a center of mass of the first blade 121 is offset, in a direction parallel to the engine central longitudinal axis A-A', from a center of mass of the second blade 122. Said differently, while the tandem blades 120 may partially axially overlap each other (e.g., trailing edge of blade 121 may axially overlap a leading edge of blade 122), a major portion of the body of the first blade 121 is axially offset from a major portion of the body of the second blade 122.

A traditional compressor configuration generally has the last stages in the pattern of stator stage, rotor stage, stator stage, rotor stage, and exit guide vane stage. In various embodiments described herein, one of the blade stages 101 is a tandem blade stage (i.e., tandem rotor disk apparatus 100) having two blades 121, 122 that are axially adjacent each other without an intervening stator/vane stage 105. By removing one of the stator vane stages 105, fewer respective shrouded cavities, such as shrouded cavity 109, are warranted. Shrouded cavities, such as shrouded cavity 109, tend to increase metal temperatures because of the interface between a seal, typically a knife edge seal 108, and the rotor disk. The increased temperatures at the knife edge seal 108 can cause increased overall temperatures as part of windage heat-up. By removing one or more of the shrouded cavities 109 by incorporating the tandem rotor disk apparatus 100, the windage heat-up is reduced and temperatures of other engine components in the high pressure compressor 52 are also reduced. Those skilled in the art will readily appreciate that by reducing the temperatures, the component life of the gas turbine engine 20 can be improved.

While embodiments of the tandem rotor disk apparatus 100 are described herein with respect to a gas turbine engine, and more specifically with reference to a high pressure compressor of a gas turbine engine, those skilled in the art will readily appreciate that embodiments of the tandem rotor disk apparatus 100 may be used in a variety of gas turbine engines and in a variety of sections/locations throughout a gas turbine engine. For example, the tandem rotor disk apparatus 100 may be used in the fan section 22, the low pressure compressor 44, and/or the turbine section 28 of the gas turbine engine.

In various embodiments, and with reference to FIGS. 2, 3, 4, 5A, 5B, 6, 7A, 7B, and 8, various configurations of tandem rotor disk apparatus 100 are provided. For example, FIGS. 2, 3, 4, 5A, 5B, 6, 7A, 7B, and 8 illustrate various structural configurations pertaining to how the tandem blades 120 extend radially outward from the rotor disk body 110. For example, in various embodiments one of the first blade 121 and the second blade 122 is coupled to the rotor disk body 110 via an engagement configuration/feature while the other of the first blade 121 and the second blade 122 is integrally formed with the rotor disk body 110 (e.g., FIGS. 5A and 5B). In various embodiments, both the first blade 121 and the second blade 122 are coupled to the rotor disk body 110 (and are thus not integrally formed with the rotor disk body 110) (e.g., FIGS. 2, 3, 7A, and 7B). In various embodiments, both the first blade 121 and the second blade 122 are integrally formed with the rotor disk body 110 (e.g., FIG. 8). In various embodiments, the tandem rotor disk apparatus 100 may include multiple rotor disk bodies (e.g., FIGS. 4 and 6). Details from the various configurations may be combined in various manners to provide additional implementations for the tandem rotor disk apparatus 100. Throughout the present disclosure, like numerals denote like elements.

Figure 2:
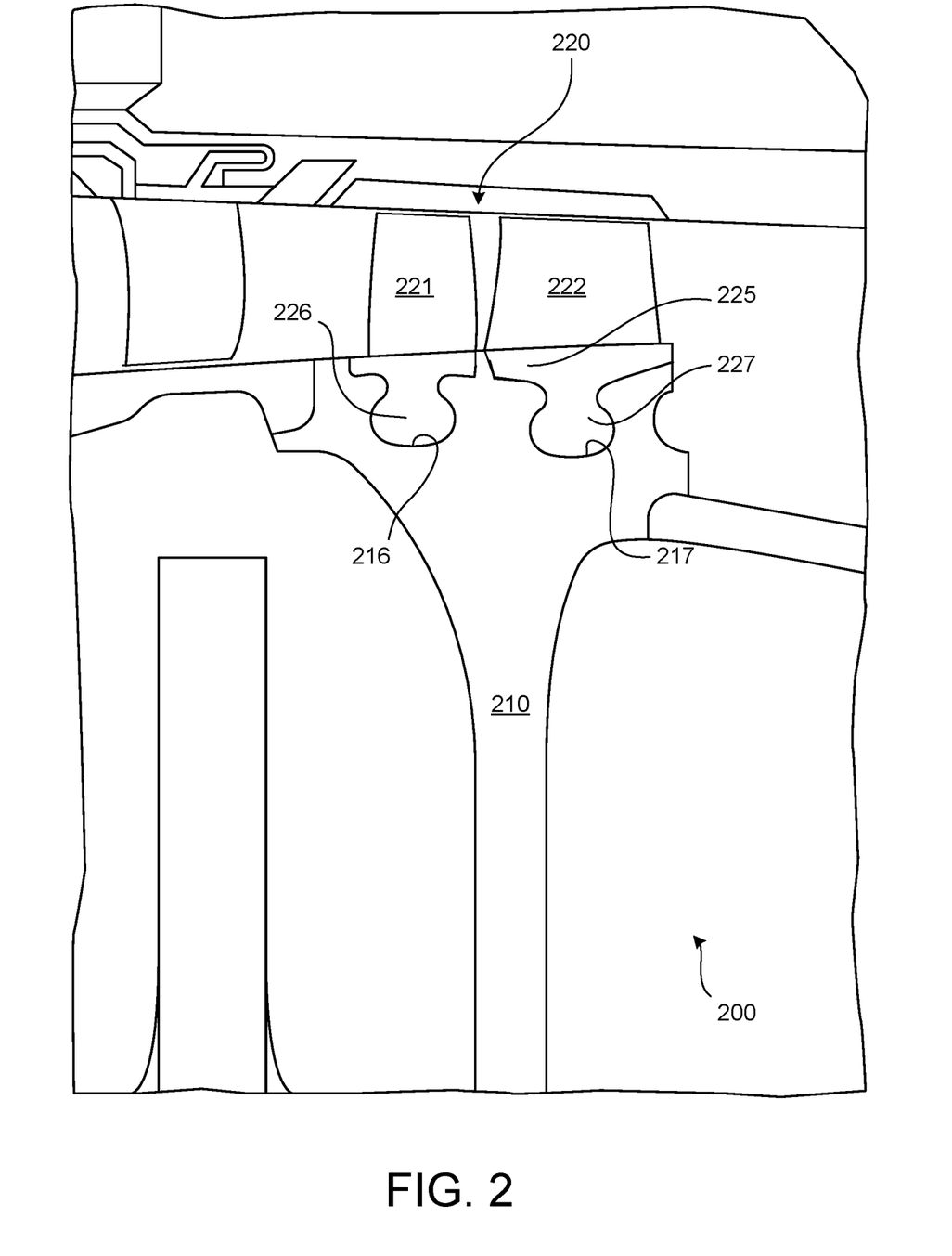
FIG. 2 is a cross-sectional view of a tandem rotor disk apparatus having tandem blades, in accordance with various embodiments.

In various embodiments, and with reference to FIG. 2, both the first blade 221 and the second blade 222 of the tandem blades 220 are coupled to the rotor disk body 210. In various embodiments, the coupling between the tandem blades 220 and the rotor disk body 210 is detachable, thereby allowing individual blades (or individual sets of tandem blades) to be repaired and/or replaced. In various embodiments, and with continued reference to FIG. 2, the first blade 221 and the second blade 222 are individually/separately coupled to the rotor disk body 210. In various embodiments, the first blade 221 and the second blade 222 may be coupled to the rotor disk body 210 via tangential (i.e., circumferential) engagement. Said differently, the first blade 221 and the second blade 222 may include respective blade platforms that have engagement features 226, 227 that axially engage with complimentary engagement features 216, 217 of the rotor disk body 210. For example, the blades 221, 222 may slide tangentially or circumferentially into engagement with one or more circumferential channels/grooves 216, 217.

Figure 3:
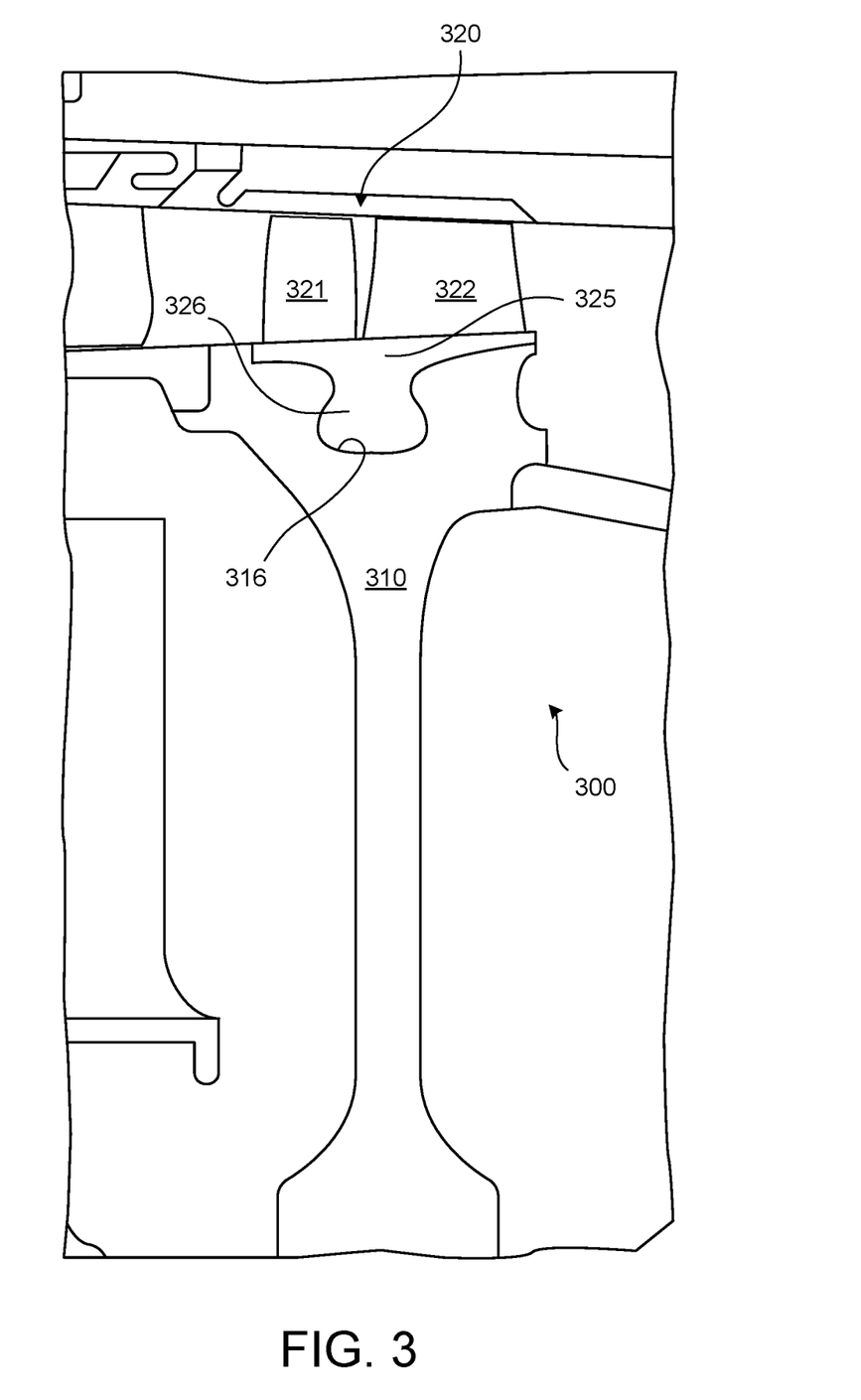
FIG. 3 is a cross-sectional view of a tandem rotor disk apparatus having tandem blades, in accordance with various embodiments.

In various embodiments, and with reference to FIG. 3, the tandem rotor disk apparatus 200 includes a first blade 321 and a second blade 322 that are integrally formed together (i.e., may share a blade platform) and thus the tandem blades 320 may include a single blade platform engaged with and disposed radially outward from the rotor disk body 310. In various embodiments, both the first blade 321 and the second blade 322 are jointly coupled to the rotor disk body 310 via complementary engagement features 326, 316. In other words, the first blade 321 and the second blade 322 may be coupled to the rotor disk body 310 simultaneously and in a single action.

Figure 4:
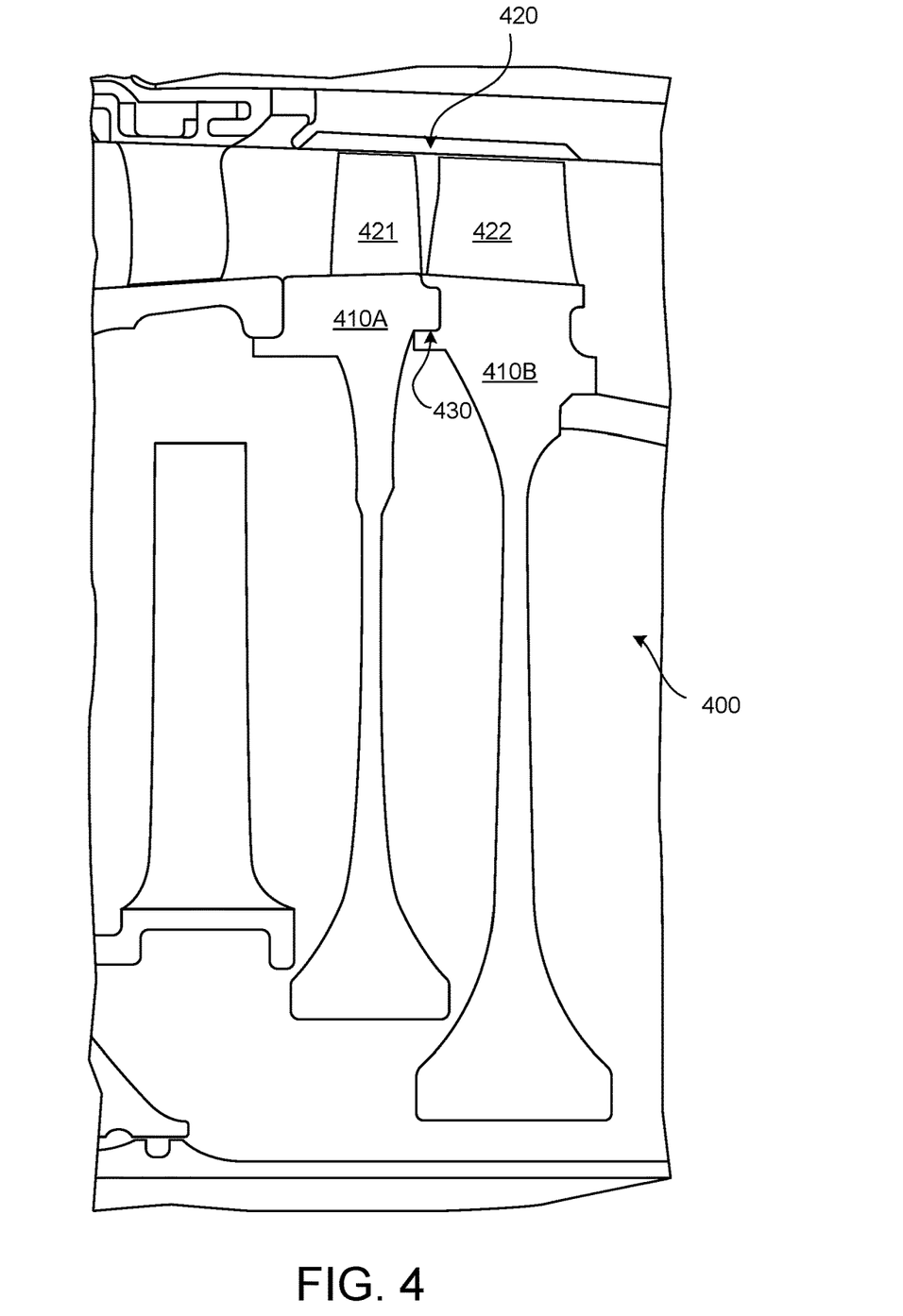
FIG. 4 is a cross-sectional view of a tandem rotor disk apparatus having tandem blades, in accordance with various embodiments.
Figure 6:
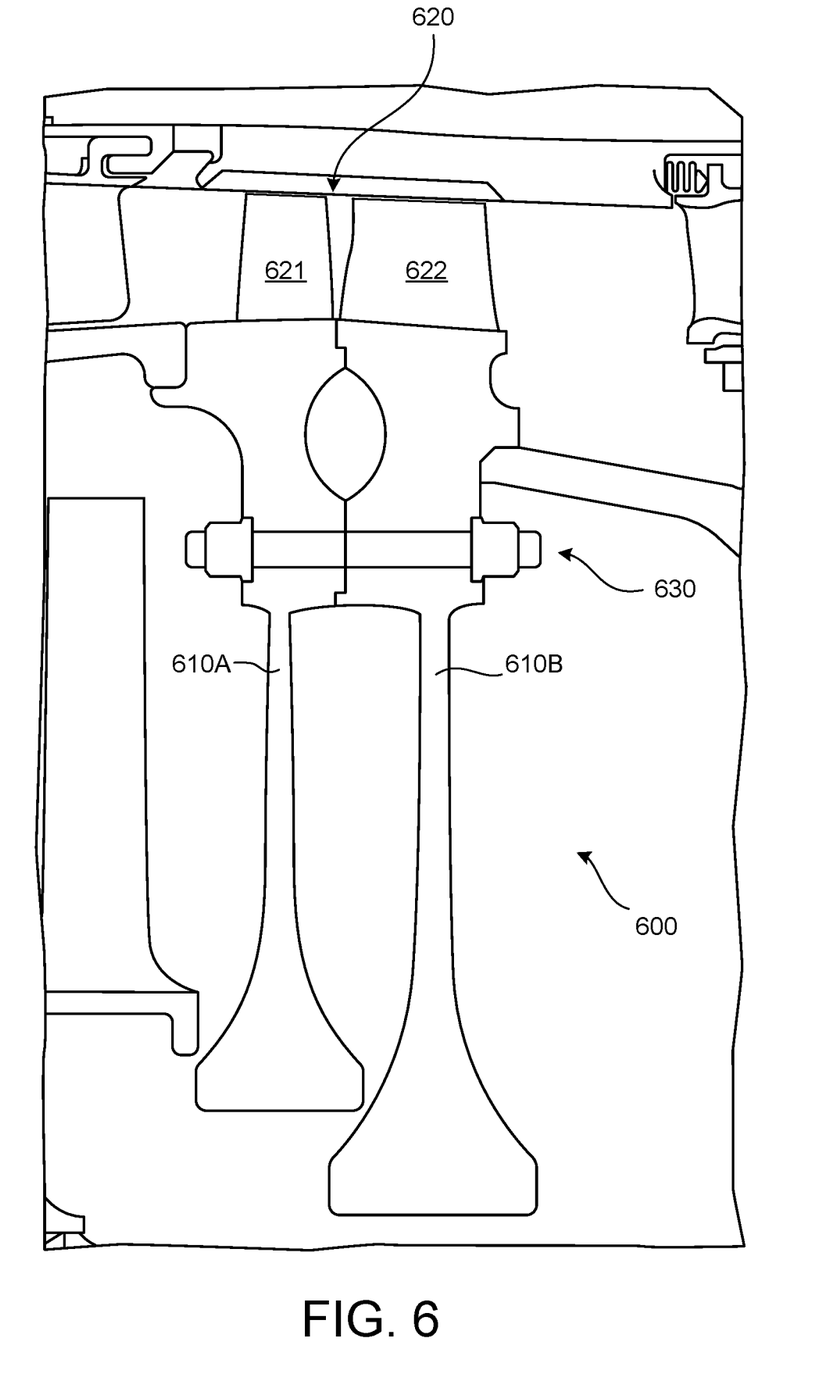
FIG. 6 is a cross-sectional view of a tandem rotor disk apparatus having tandem blades, in accordance with various embodiments.

In various embodiments, and with reference to FIGS. 4 and 6, the tandem rotor disk apparatus may include two rotor disk bodies that are directly coupled together. In various embodiments, and with reference to FIG. 4, the tandem rotor disk apparatus 400 includes a first rotor disk body 410A and a second rotor disk body 410B that are both concentric about the engine central longitudinal axis A-A' of the gas turbine engine 20. The first blade 421 may extend radially outward from the first rotor disk body 410A and the second blade 422 may extend radially outward from the second rotor disk body 410B. Thus, the tandem blades 420 may extend from separate rotor disk bodies 410A, 410B and the rotor disk bodies 410A, 410B may be coupled together via a snap or interference fit 430. In various embodiments, and with reference to FIG. 6, the tandem rotor disk apparatus 600 includes a first rotor disk body 610A and a second rotor disk body 610B that are both concentric about the engine central longitudinal axis A-A' of the gas turbine engine 20. The first blade 621 may extend radially outward from the first rotor disk body 610A and the second blade 622 may extend radially outward from the second rotor disk body 610B. Thus, the tandem blades 620 may extend from separate rotor disk bodies 610A, 610B and the rotor disk bodies 610A, 610B may be coupled together via one or more tie rods 630.

Figures 5A, 5B:
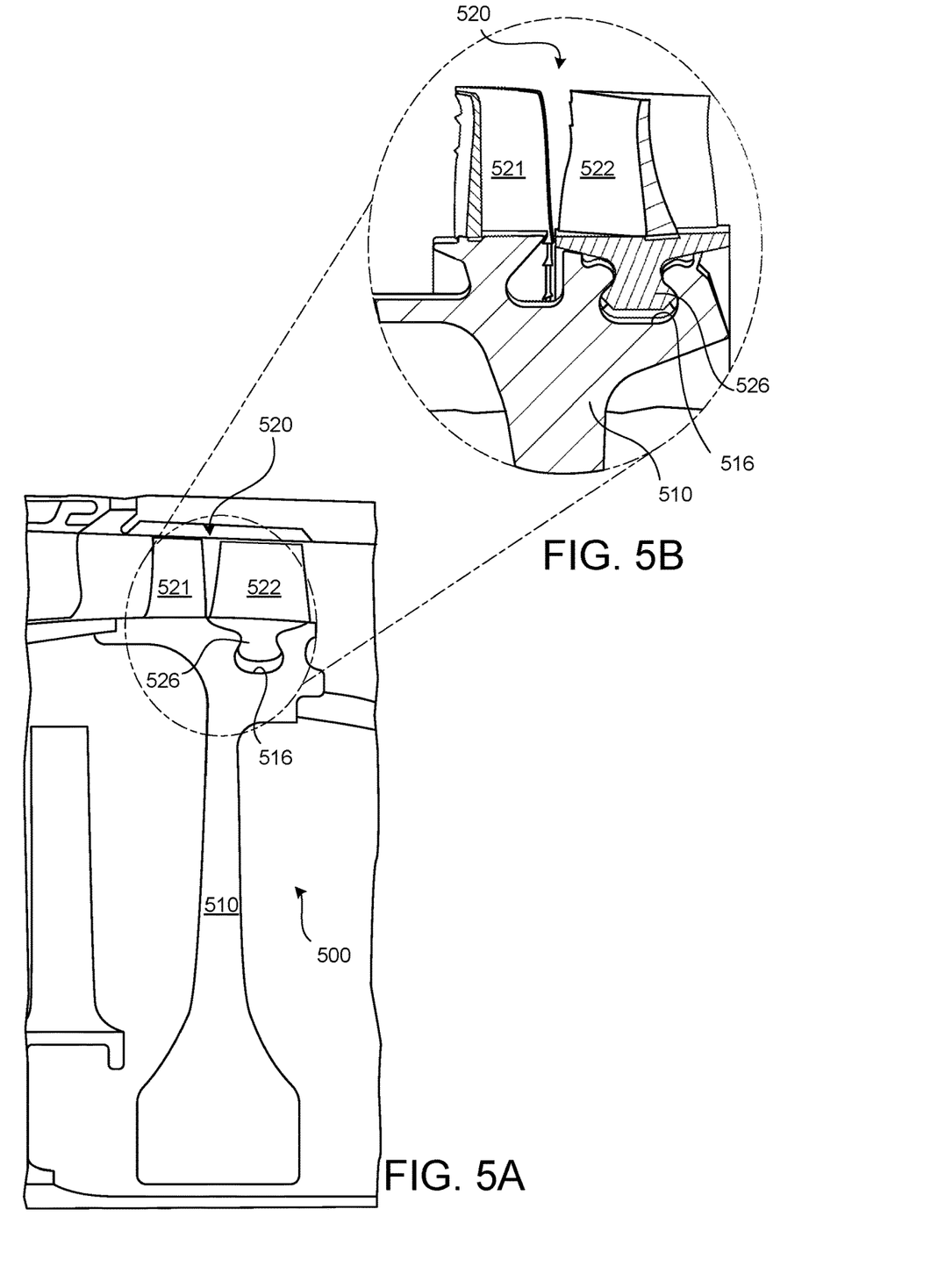
FIG. 5A is a cross-sectional view of a tandem rotor disk apparatus having tandem blades, in accordance with various embodiments.
FIG. 5B is a magnified, perspective, cross-sectional view of a tandem rotor disk apparatus having tandem blades, in accordance with various embodiments.

In various embodiments, and with reference to FIGS. 5A and 5B, one blade of the tandem blades 520 may be coupled to the rotor disk body 510 while the other may be integrally formed with the rotor disk body 510. Thus, the tandem rotor disk apparatus 500 may have one blade that is detachably coupled to the rotor disk body 510 and one blade that is integrally formed with the rotor disk body 510. For example, the first blade 521 may be integrally formed with the rotor disk body 510 while the second blade 522 is coupled to the rotor disk body 510. The second blade 522 may be coupled, as mentioned above, via circumferential/tangential engagement with the rotor disk body 510. In various embodiments, the blade platform of the second blade 522 may have a dovetail-shaped protrusion 526 that engages a corresponding channel 516 of the rotor disk body 510. In various embodiments, a gap may be defined between the radially inward surface of the protrusion/engagement feature of the second blade 522 and the radially outward surface of the channel/engagement feature of the rotor disk body 510.

Figure 7A:
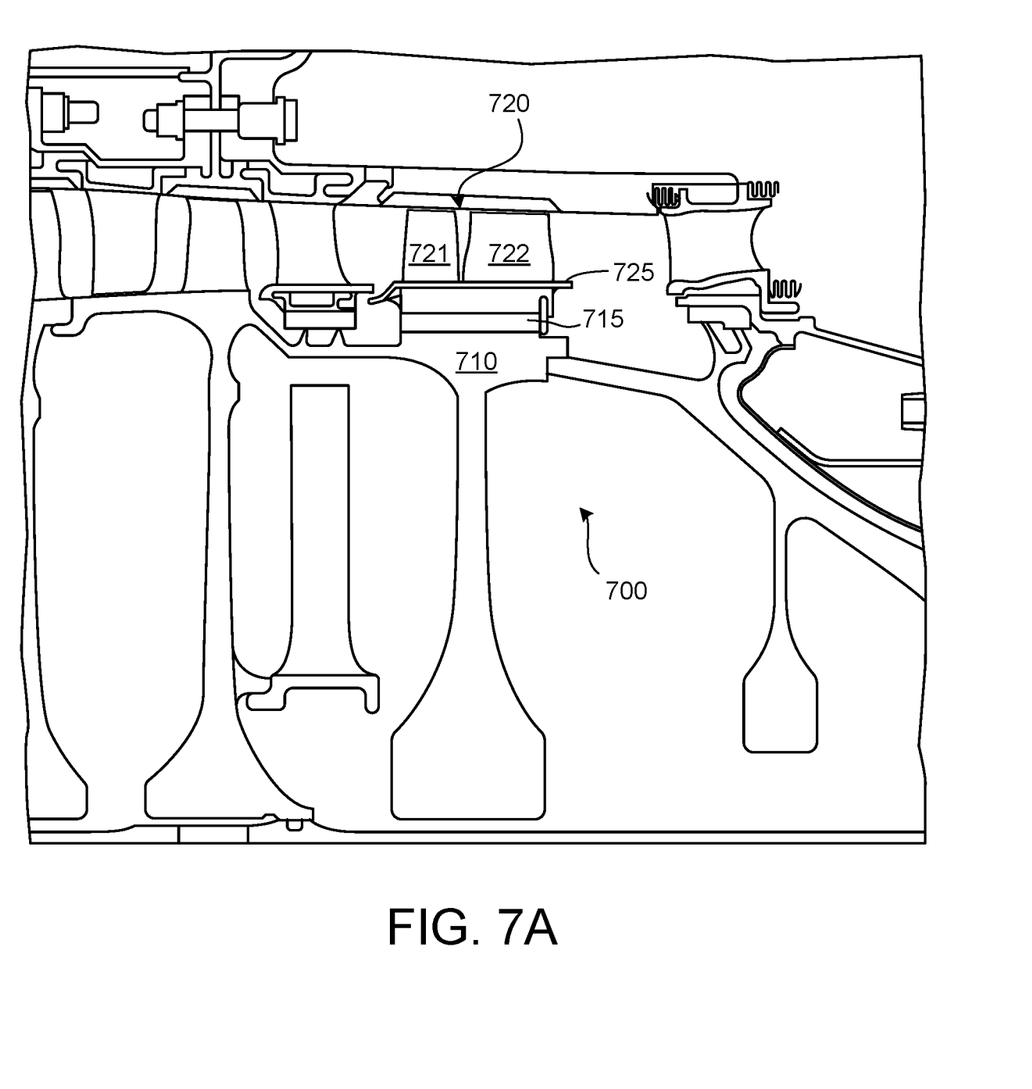
FIG. 7A is a cross-sectional view of a tandem rotor disk apparatus having tandem blades, in accordance with various embodiments.
Figure 7B:
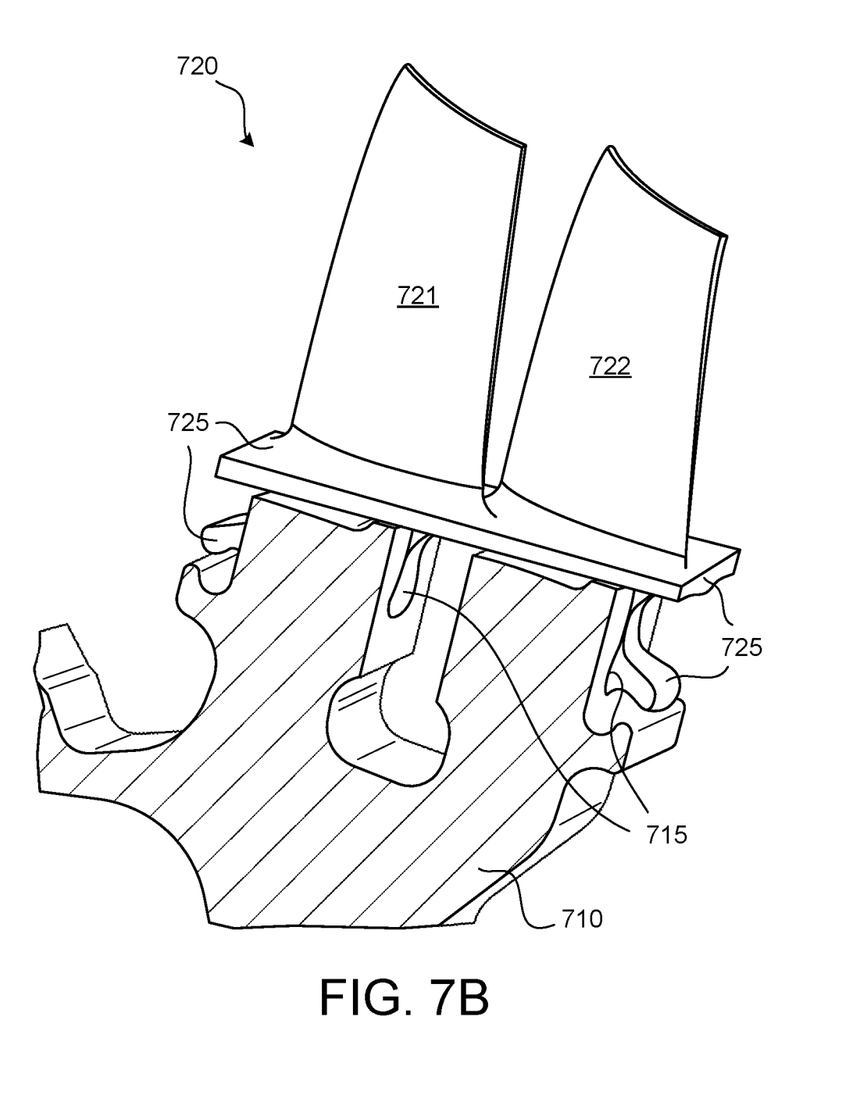
FIG. 7B is a magnified, perspective, cross-sectional view of a tandem rotor disk apparatus having tandem blades, in accordance with various embodiments.

In various embodiments, and with reference to FIGS. 7A and 7B, the tandem rotor disk apparatus 700 may include tandem blades 720 that are coupled to the rotor disk body 710 via axial engagement. For example, a blade platform 725 of the first blade 721 and the second blade 722 may include protrusions that may be axially moved into one or more complementary channels/grooves 715 of the rotor disk body 710 to retain the tandem blades 720 in place. In various embodiments, the first blade 721 and the second blade 722 may be integrally formed together and thus both may be simultaneously coupled to the rotor disk body 710. In various embodiments, however, the first blade 721 and the second blade 722 may be separate from each other and thus may be individually moved axially into engagement with the rotor disk body 710. In various embodiments, the axially extending groove/channel 715 provides cooling benefits to the tandem rotor disk apparatus 700 by channeling cooling flow therethrough.

Figure 8:
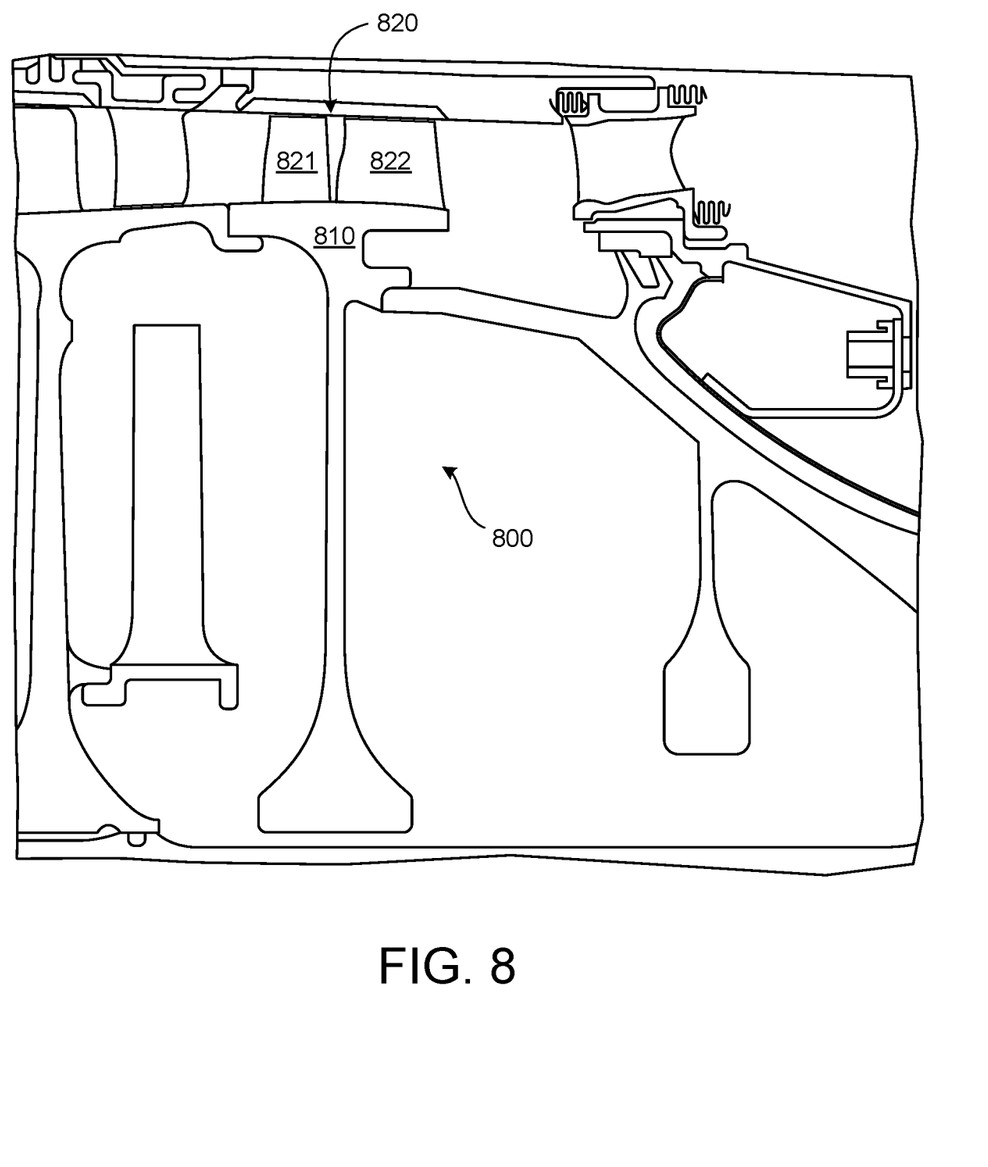
FIG. 8 is a cross-sectional view of a tandem rotor disk apparatus having tandem blades, in accordance with various embodiments.

In various embodiments, and with reference to FIG. 8, the tandem rotor disk apparatus 800 includes tandem blades 820 that are both integrally formed with the rotor disk body 810. Said differently, the first blade 821 and the second blade 822 may be integrally formed on the radially outward surface of the rotor disk body 810.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A tandem rotor disk apparatus comprising:
a first rotor disk body concentric about an axis;
a second rotor disk body directly coupled to the first rotor disk body and concentric about the axis;
a first blade extending radially outward of the first rotor disk body; and
a second blade extending radially outward of the second rotor disk body;
wherein the first rotor disk body and the first blade are offset from the second rotor disk body and the second blade in a direction parallel to the axis;
wherein the first rotor disk body is coupled to the second rotor disk body via one or more tie rods; and
wherein the first rotor disk body directly engages the second rotor disk body at a first shoulder radially outward of the one or more tie rods and a second shoulder radially inward of the one or more tie rods.

2. The tandem rotor disk apparatus of claim 1, wherein the first rotor disk body is coupled to the second rotor disk body via a snap interference fit.

3. The tandem rotor disk apparatus of claim 1, wherein the first shoulder and the second shoulder each is a step interface between the first rotor disk body and the second rotor disk body comprising radially extending surfaces and axially extending surfaces.

4. A gas turbine engine comprising:
a blade stage comprising sets of tandem blades circumferentially distributed about an engine central longitudinal axis of the gas turbine engine, wherein each set of tandem blades comprises a forward blade and an aft blade that are directly axially adjacent to each other without an intervening stator vane;
a first rotor disk body having the forward blade of each set of tandem blades extending radially outward therefrom; and
a second rotor disk body having the aft blade of each set of tandem blades extending radially outward therefrom;
wherein the first rotor disk body is coupled to the second rotor disk body via one or more tie rods;
wherein the first rotor disk body directly engages the second rotor disk body at a shoulder radially inward of the one or more tie rods.

5. The gas turbine engine of claim 4, wherein the blade stage is of a compressor section.

6. The gas turbine engine of claim 5, wherein the blade stage is an aft-most blade stage of the compressor section.

7. The gas turbine engine of claim 4, wherein the first rotor disk body directly engages the second rotor disk body at another shoulder radially outward of the one or more tie rods.

8. The gas turbine engine of claim 4, wherein the shoulder is a step interface between the first rotor disk body and the second rotor disk body comprising radially extending surfaces and axially extending surfaces.

* * * * *